United States Patent
Hughes, Jr. et al.

(10) Patent No.: US 7,143,490 B2
(45) Date of Patent: Dec. 5, 2006

(54) TAP PROCESS FOR HARD WORKPIECES

(75) Inventors: Ralph W. Hughes, Jr., Martinez, GA (US); Troy F. Walters, Augusta, GA (US)

(73) Assignee: Kennametal Inc., Latrobe, PA (US)

( * ) Notice: Subject to any disclaimer, the term of this patent is extended or adjusted under 35 U.S.C. 154(b) by 446 days.

(21) Appl. No.: 10/387,240

(22) Filed: Mar. 12, 2003

(65) Prior Publication Data

US 2004/0179906 A1 Sep. 16, 2004

(51) Int. Cl.
*B23C 7/00* (2006.01)
*B23P 19/04* (2006.01)

(52) U.S. Cl. .................. 29/243; 33/636; 279/126; 409/234

(58) Field of Classification Search ............. 409/234; 33/636, 638–639, 642; 279/126, 156; 29/33 K, 29/243, 700
See application file for complete search history.

(56) References Cited

U.S. PATENT DOCUMENTS

| | | | | |
|---|---|---|---|---|
| 2,077,937 | A * | 4/1937 | Komow ................. | 408/112 |
| 3,847,499 | A | 11/1974 | Heyworth et al. ......... | 408/1 |
| 3,901,619 | A | 8/1975 | Scritchfield ............. | 408/1 |
| 3,985,463 | A | 10/1976 | Hallal ................. | 408/116 |
| 4,255,056 | A | 3/1981 | Peterson ............... | 356/401 |
| 4,466,762 | A | 8/1984 | Menke ................. | 408/222 |
| 4,539,832 | A | 9/1985 | Koller ................. | 72/118 |
| 4,623,286 | A | 11/1986 | Hitt ................... | 408/116 |
| 4,708,542 | A | 11/1987 | Emanuelli .............. | 408/144 |
| 4,740,120 | A | 4/1988 | Wickham et al. | |
| 5,009,555 | A | 4/1991 | Kitamura | |
| 5,035,019 | A | 7/1991 | Dias | |
| 5,118,231 | A | 6/1992 | Daniels | |
| 5,271,697 | A | 12/1993 | Johnson et al. | |
| 5,280,671 | A * | 1/1994 | Marquart .............. | 29/447 |
| 5,281,059 | A | 1/1994 | Stuckle | |
| 5,487,626 | A | 1/1996 | Von Holst et al. | |
| 6,216,335 | B1 * | 4/2001 | Freyermuth ............ | 29/701 |
| 6,231,282 | B1 | 5/2001 | Yoneyama et al. | |
| 6,257,809 | B1 | 7/2001 | Silken ................. | 408/129 |
| 6,588,083 | B1 * | 7/2003 | Voss et al. ............. | 29/407.08 |
| 6,701,597 | B1 * | 3/2004 | Voss et al. ............. | 29/407.05 |
| 6,861,625 | B1 * | 3/2005 | Haimer et al. .......... | 219/607 |
| 2006/0039770 | A1 * | 2/2006 | Hughes et al. .......... | 409/234 |
| 2006/0051168 | A1 * | 3/2006 | Hughes et al. .......... | 408/1 R |
| 2006/0051169 | A1 * | 3/2006 | Hughes et al. .......... | 408/1 R |
| 2006/0093447 | A1 * | 5/2006 | Hughes et al. .......... | 408/1 R |
| 2006/0099038 | A1 * | 5/2006 | Hughes et al. .......... | 408/1 R |

FOREIGN PATENT DOCUMENTS

WO  WO0189758 A1 * 11/2001

* cited by examiner

*Primary Examiner*—Monica Carter
*Assistant Examiner*—Eric A. Gates
(74) *Attorney, Agent, or Firm*—Matthew W. Smith

(57) ABSTRACT

A process and apparatus for producing screw threads in hard material workpieces with a series of taps. The present invention employs a threaded bore formed in a bracket assembly to align and position multiple taps on a rotary machine. The taps are used in sequence to cut threads progressively deeper into a substrate. The present invention provides a method of aligning and orienting each progressive tap to begin its cut at the same initial starting point.

4 Claims, 6 Drawing Sheets

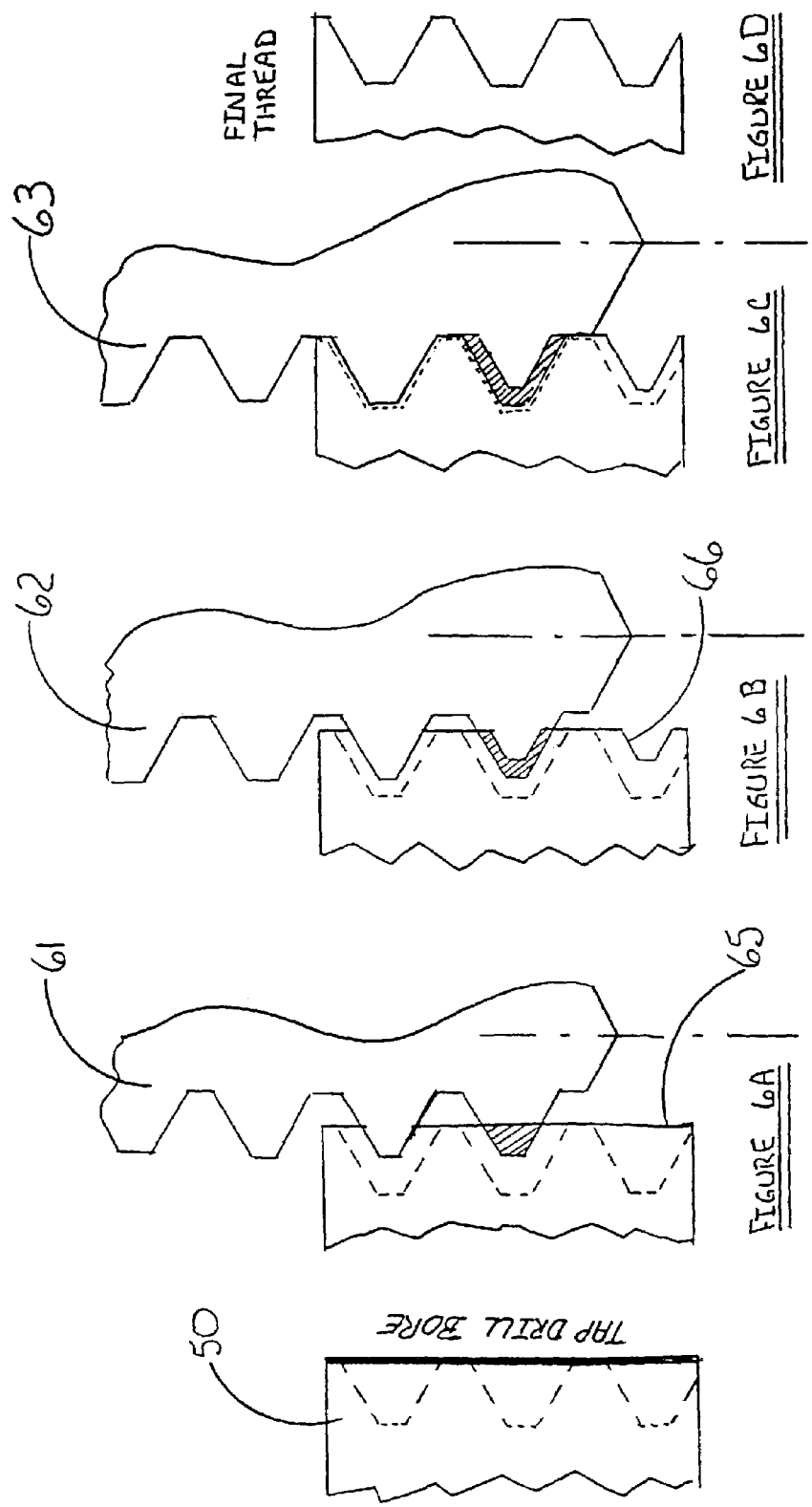

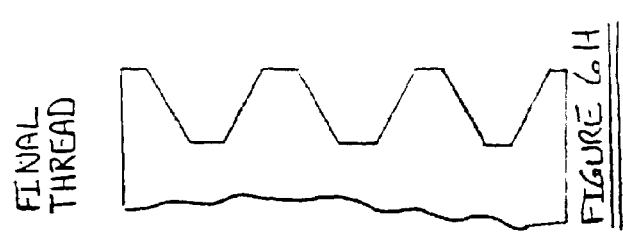
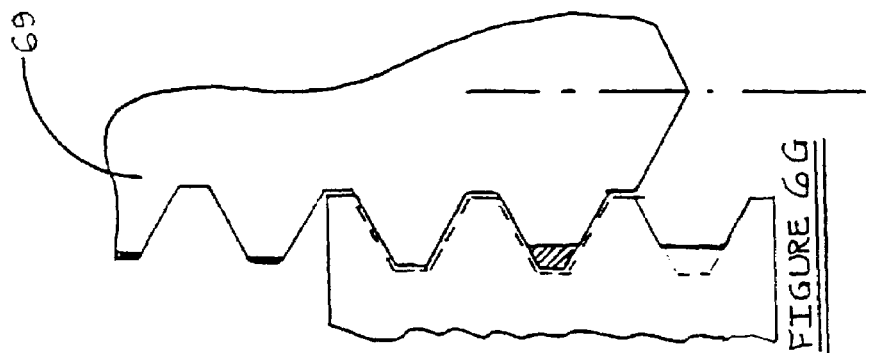
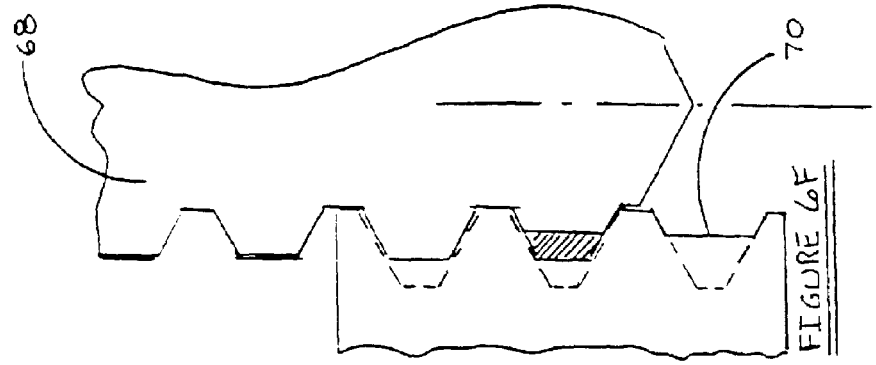
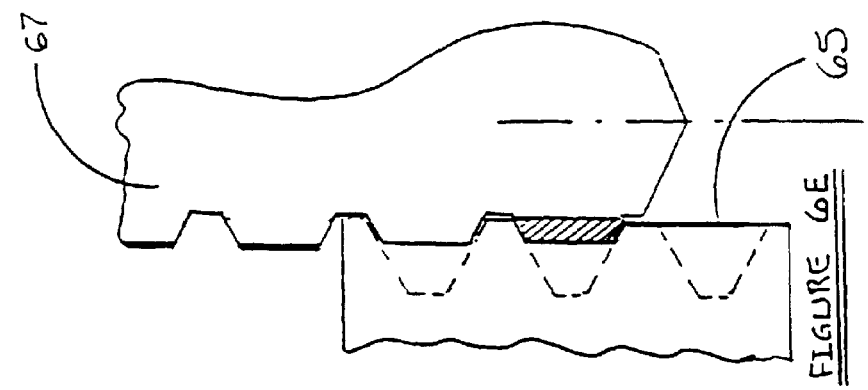
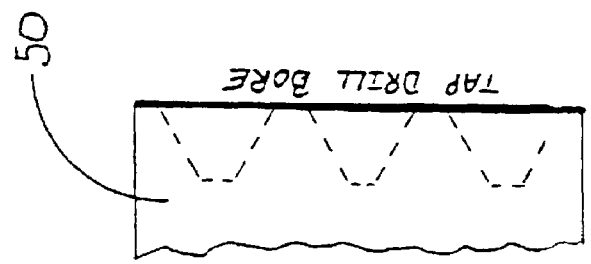

TAP PROCESS FOR HARD WORKPIECES

FIELD OF THE INVENTION

The present invention relates to an improved method and apparatus for forming internal screw threads with taps.

BACKGROUND

Current methods of tapping, or forming threads in a hole, generally use a hard steel tap with a tapered threaded first end that cuts the threads as it is rotated at a second end. Longitudinal grooves, or flutes, which may be straight or helical, interrupt the spiral thread form to generate cutting elements, and to provide clearance space for the chips generated by the cutting elements. Binding of the tap requires increasing torque at the driving end to advance it. The increased twisting of the tap may break it, often leaving the cutting end broken and stuck in the hole. This not only results in loss of the tap, but often means scrapping the part due to the high cost of removal of the broken tap. After a hole is tapped, the tap is removed by reverse rotation.

Because of the danger of tap breakage, it is common practice to periodically reverse rotate to break off the chips.

The method of forming internal threads in workpieces that must be hardened, such as in steel alloy, begins when a tap drill bore is drilled into the soft workpiece and then a tap would be used to cut out the internal threads. Then, after the thread is completed, the workpiece would be subjected to heat treatment to harden the workpiece material. When attempts have been made to form internal threads in a hardened workpiece, the machining operation was very difficult, and the taps would break and fail. Breakage is almost certain when tapping small diameter holes, because the web of the tap with it's small cross section is much weaker and less resistant to the required cutting torque.

When workpiece materials such as steel alloys are heat treated after internal threads are made, they have a tendency to cause the threads and or the workpiece surfaces to deform, making true thread form and accurate location difficult to control.

There is a need in the industry for a tapping system that can quickly manufacture internal threads within an acceptable tolerance in hard workpieces.

The present invention provides a method of tapping a hole in a hard workpiece wherein the internal threads are formed quickly and with precision. These and other objects and advantages of the invention, as well as the details of illustrative embodiments, will be more fully understood from the following specification and drawings.

BRIEF DESCRIPTION OF THE DRAWINGS

FIG. 6A is a partial view of a representation of the first step in a tapping process of a first embodiment of the present invention cutting an initial rough thread in a tap drill bore. In this embodiment the pitch diameter is reduced from the full thread form.

FIG. 6B is a partial view of a representation of a second step in the tapping process of the first embodiment of present invention. In this embodiment the pitch diameter is reduced to a lesser amount than the first step tap from the full thread form.

FIG. 6C is a partial view of a representation of a third step in the tapping process of a first embodiment of the present invention. In this illustration the tap represents the full thread form.

FIG. 6D is a partial view of the final internal threads formed in a workpiece by the first embodiment.

FIG. 6E is a partial view of a representation of the first step in a tapping process of a second embodiment of the present invention cutting an initial rough thread in a tap drill bore. This example illustrates a reduced major diameter in place of a reduced pitch diameter.

FIG. 6F is a partial view of a representation of a second step in the tapping process of a second embodiment of the present invention. This example illustrates a reduced major diameter in place of a reduced pitch diameter.

FIG. 6G is a partial view of a representation of a third step in the tapping process of a second embodiment of the present invention. In this illustration the tap represents the full thread form.

FIG. 6H is a partial view of the final internal threads formed in a workpiece by the second embodiment.

DETAILED DESCRIPTION OF THE INVENTION

Figures 2, 3:
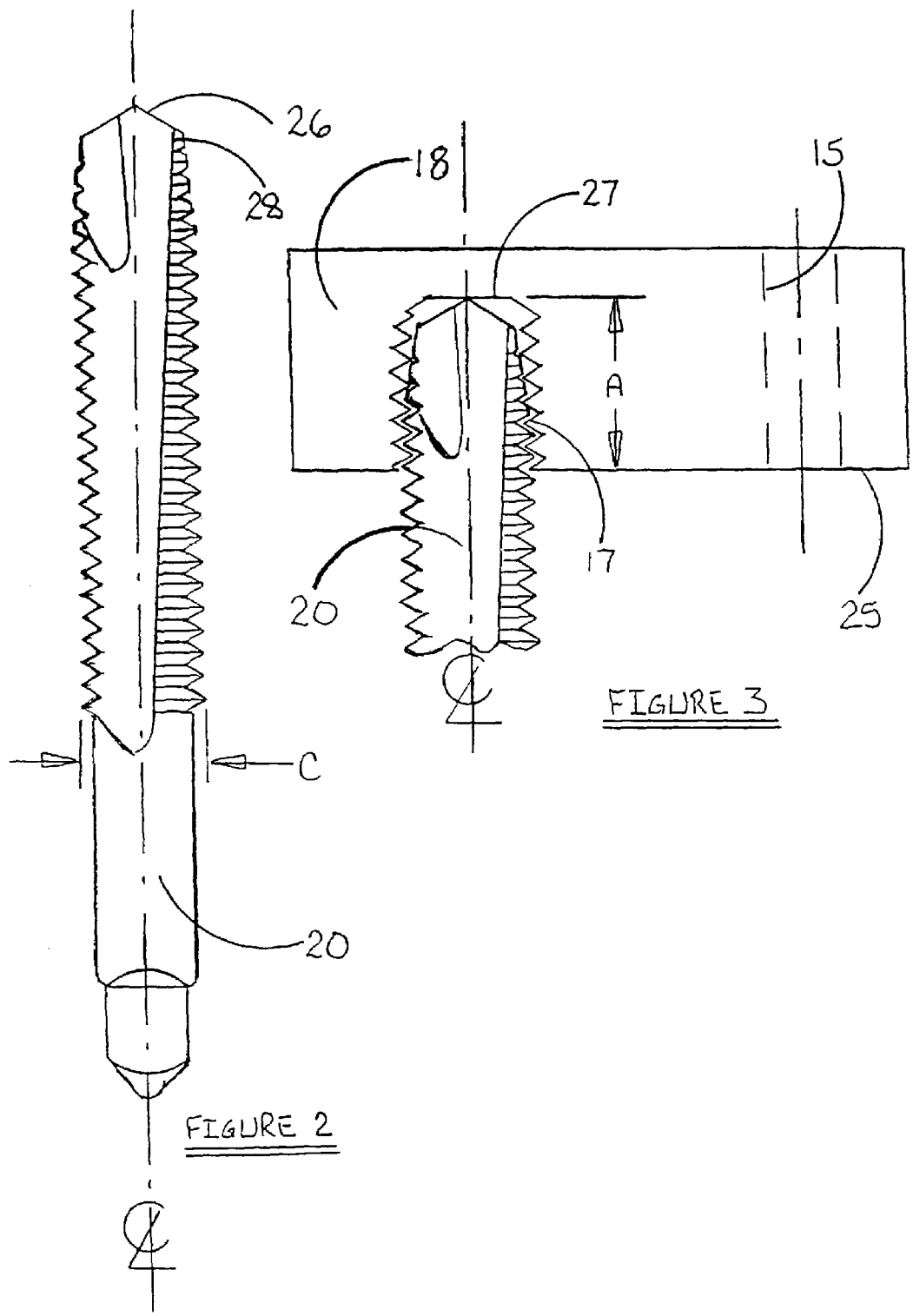
FIG. 2 is a side view representation of a tap that can be accurately positioned with the alignment assembly of the present invention.
FIG. 3 is a detailed side view of a standard tap plus a portion of the alignment assembly in its assembled position prior to connection to the main tool fixture.

An improved method of making internal threads with a series of taps used in sequence is disclosed in the instant invention. The threads formed in the embodiment of the present invention disclosed herein are produced by cutting. However, it is contemplated that the disclosed present invention could alternatively have a similar application in "forming" threads in metal substrates as apposed to cutting out the threads. In such an alternative embodiment of the present invention the taps would extrude the thread form rather than cut threads in the metal substrate. One embodiment of a tap used in the present invention is illustrated in FIG. 2. The shape of the tap is only representative of one style of tap that might be used in accordance with the invention as will be appreciated and apparent to an ordinary artisan.

A plurality of universal milling tapping and boring machines and special numerical controlled machines with the ability to accurately change tools in their spindle are well known in the industry. Universal milling and boring machines each have the capability of holding a plurality of tools, each of which perform one or more machining operations on a work piece in accordance with a programmed computer. Some machines are capable of holding a few to hundreds of tools on an automatic tool changer having a spindle or a magazine on which tool chucks/holders are positioned, each chuck/holder with a tool having a particular machining function. The process being described by this present invention works whether the tools are changed manually or automatically. Automatic tool changing is a standard feature on most machine spindles in the industry.

During operation of the universal boring and milling machines, once a cutting tool is connected to the spindle, it performs its programmed cutting function until another tool is needed to begin the next cutting operation step. Machine tools in the industry have rotary driven spindles that, after each machining operation, the spindles are positioned to the same set starting point. That is, after a new tool is connected to the spindle, the spindle returns back to its original zero set point. The spindle is three dimensionally returned to its original three dimensioned position, to the same zero set point, including the same angular orientation and axial position prior to beginning the next programmed operational step. This zero set point spindle position control feature is well known in the industry and included in all rigid and synchronous tapping CNC routines.

Figure 4:
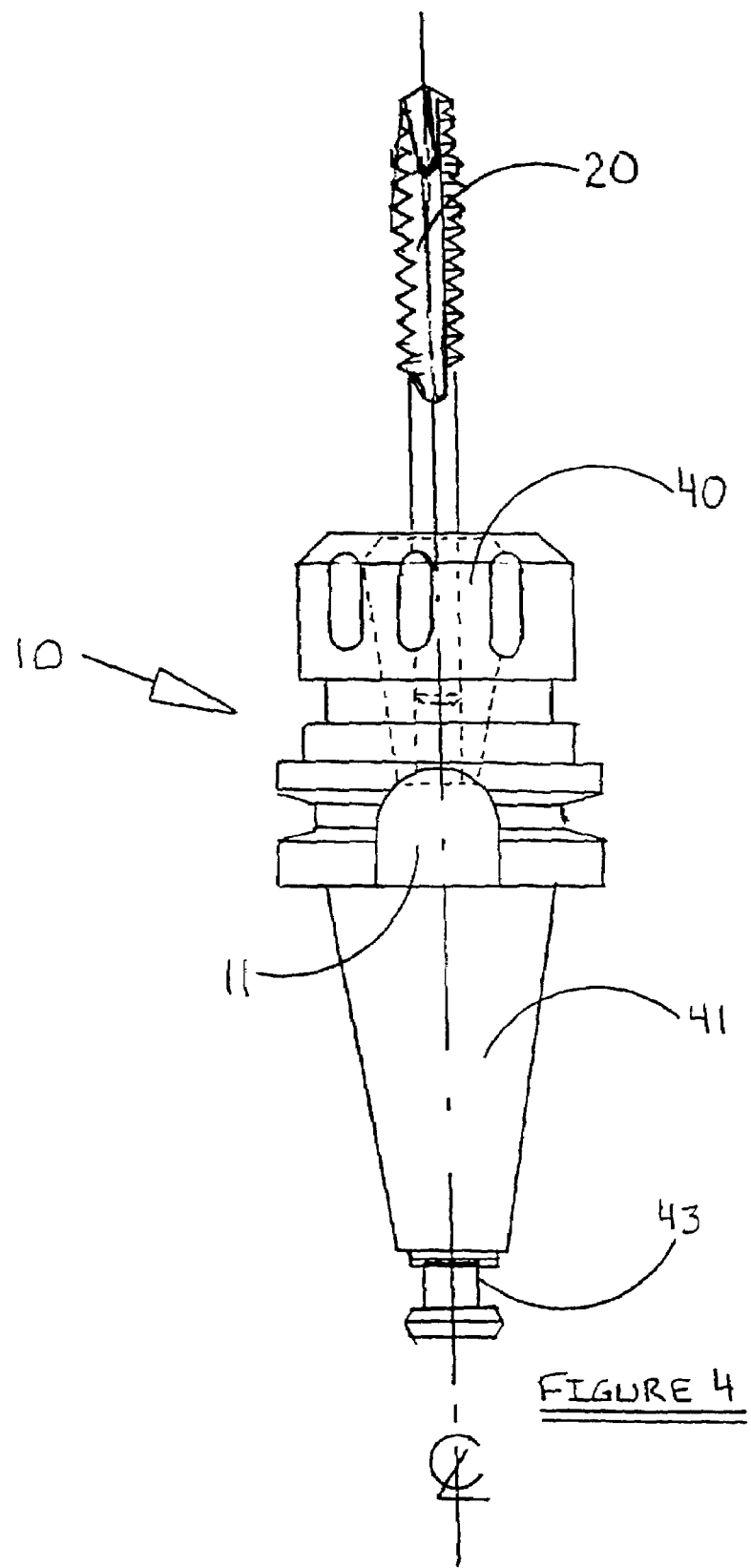
FIG. 4 illustrates a tap fixed to a chuck.

Universal tool holders/chucks are used to connect tools to such spindles and magazines. These tool holders/chucks typically have a tapered frustoconical section, as for instance shown at 41 in FIG. 4. Some well-known industry standards, such as HSK, KM, and CAPTO tooling systems, have cone surfaces but no rearward pin 43. The tapered section 41 is received in a frustoconical cavity within a spindle on a rotary machine. The precise fit between spindle and tool holder tapers provides the accuracy, orientation and the rigidity needed to perform the machining operation. Some method of retention is also provided within the spindle in the form of grippers and pull back systems. There is not just one standard chuck/holder in the rotary machine cutting industry, but several tool holder/chuck shapes and sizes, including but not limited to CV, BT, HSK, CAPTO, KM holder/chucks and a few other commercially available standards. A keyway alignment slot 11 as shown in FIG. 4 is integral to a typical tool holder. Similar keyway drive slots, or orientation characteristics exist on other standard taper tools. Another similar keyway slot 11 (not shown) is on the opposite side of the chuck/holder one hundred eighty (180) degrees around the circumference of the chuck/holder in direct alignment with the first keyway slot. The keyway slots 11 are adapted to receive drive pins or keys ("drive dogs") as shown in FIG. 6 of U.S. Pat. No. 6,231,282, and as shown at 8 in U.S. Pat. No. 5,009,555. The pins snugly fit within the keyway slots 11 and resist any possible rotation of the chuck/holder about its longitudinal axis that otherwise might occur on account of the high torques and forces applied to the cutting tool during operation. The cooperating keyway on the chuck with the key on the spindle also assist in properly aligning the chuck on the machining spindle.

FIG. 2 illustrates an internal threading tap 20 according to one embodiment of the invention. The tap is received in a chuck 10, see FIG. 4, as well known in the industry. The chuck includes a collet 40 for clamping securely onto the tap 20. U.S. Pat. No. 5,118,231 and 5,009,555 disclose collet/chucks and are hereby incorporated into this specification in their entirety. FIG. 7 in U.S. Pat. No. 5,118,231 discloses a chuck with an integral collet for receiving a drill and/or other cutting tools. The method of clamping the tap within the collet is not an essential feature of the present invention. It is contemplated that in the present invention other well-known tool clamping methods for securing the position of the tap, including hydraulic, shrink whistle notch, and other well-known clamping methods may alternatively be employed to fix the tap into position after it has been properly aligned in accordance with the present invention.

As discussed above, the present invention is adapted to be incorporated with a well-known universal milling, tapping, and boring machines. The invention employs a universal milling, tapping, and boring machine to sequentially run a series of taps to cut out an internally threaded bore into a workpiece. Initially, a tap drill bore is formed in the workpiece. Next, a first tap having a shape similar to FIG. 2, with major diameter "C", slightly larger than the diameter of the tap drill bore, is first used to initially rough out the thread within the bore during a cutting operation step. The rough threads formed by the first tap are then followed by a second tap, performing a second cutting operation step, the second tap having a larger major diameter "C" than the first tap. Then finally, another third tap with even a larger major diameter "C" than the second tap is used to cut the thread deeper to finish the thread into its full size, in a third cutting operation step. Although the invention described immediately above discloses three individual taps used in sequence, the number of taps employed by the present invention is not limited to three. It could be two taps or more than three taps. The present invention introduces a new method of accurately aligning a plurality of taps to sequentially cut/form threads. The present invention is particularly suitable for cutting/forming threads when a one operation step tapping cycle- to produce the entire thread form is not viable. For instance a one operation step tapping cycle does not work well in hard workpieces.

Most universal rotary machines for boring, tapping, and milling in the industry have the spindle zero set point feature described above. The zero set point feature returns the spindle back to its original orientation upon completion of a machining cycle with a selected tool. Each selected tool in a rotary machine has the same initial starting point, zero set point. The present invention is used in combination with such rotary machines having this zero set point feature. With the present invention, each subsequent tap in the series can be easily oriented axially and radially to begin cutting at the same position so that a subsequent tap is not misaligned with a roughed out cut made with a proceeding tap. If a subsequent tap is not accurately aligned, a second misaligned cut results. The second cut does not increase the rough cut fuller as intended, but forms a second thread cut askew of the first rough cut or possibly the second tap breaks. It is necessary to have an accurate system wherein all the taps used in a series, upon connection to the rotary machine, are each positioned so as to have the same axial position and angular orientation when the spindle is at zero set point.

Figure 1:
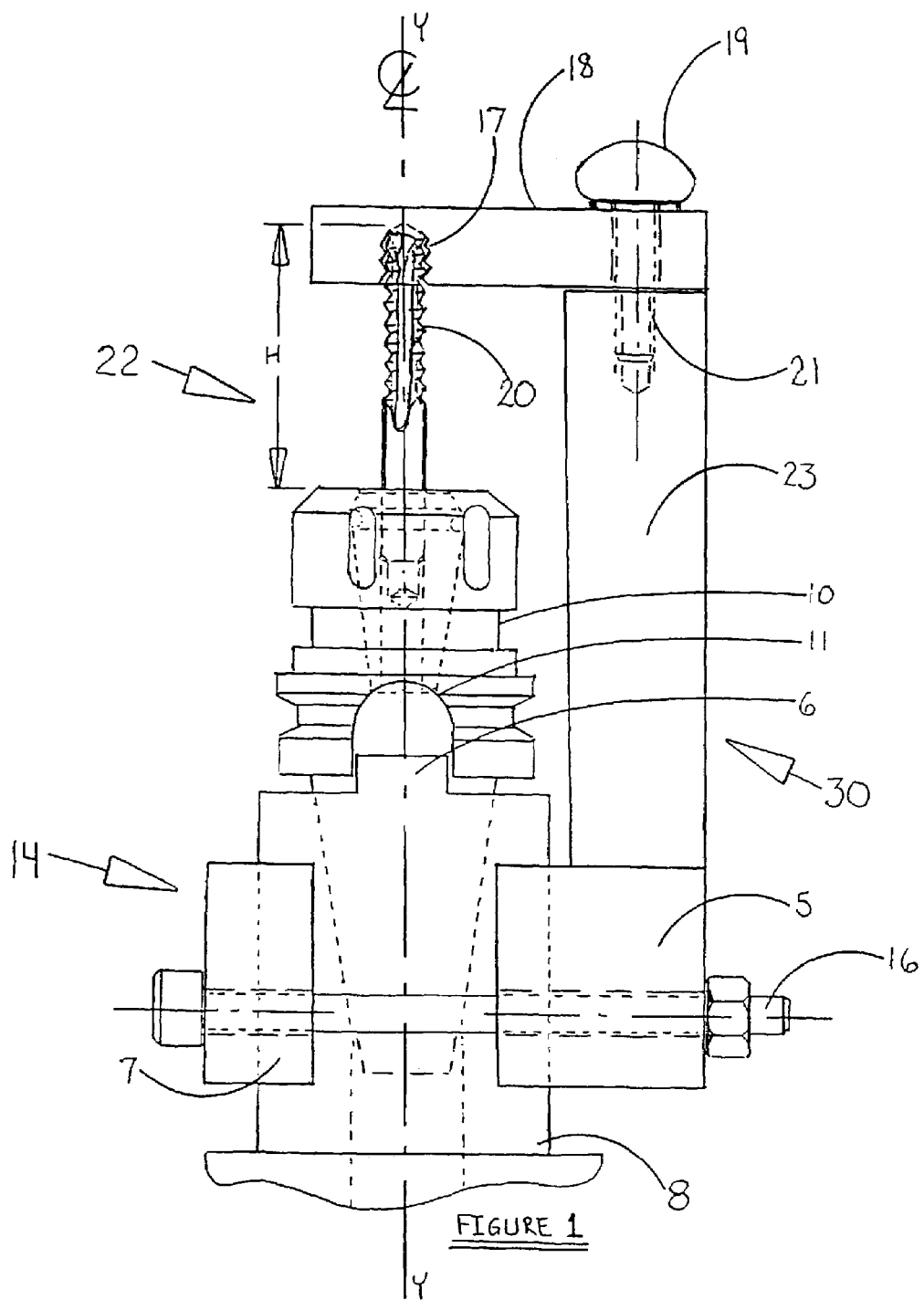
FIG. 1 is a cross section view of the assembly of the present invention.

FIG. 1 illustrates an alignment assembly 22 for accurately positioning a tap 20 radially and axially within a chuck 10. The alignment assembly 22 comprises a bracket 30 and fixed support block 8. The bracket 30 includes a bottom clamp assembly 14, which is fastened onto a support block 8. The support block 8 has a central axis Y—Y and a key 6 or keys on the top surface of the block 8.

Figure 5B:
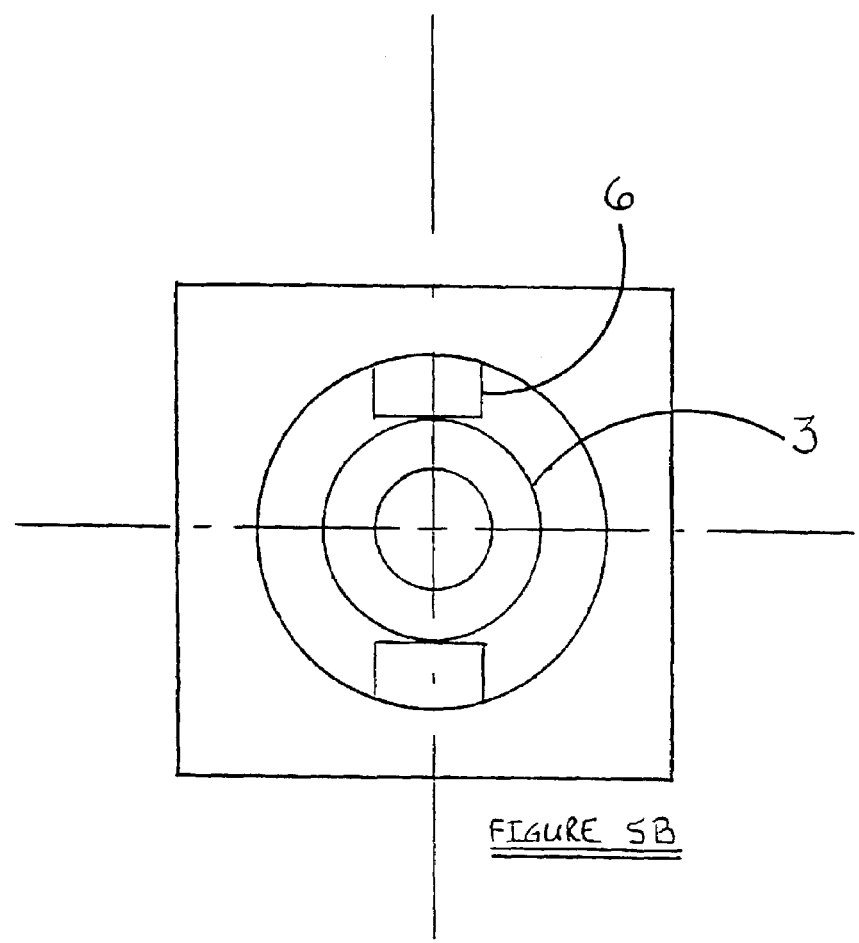
FIG. 5B is a top view of FIG. 5A.
Figure 5A:
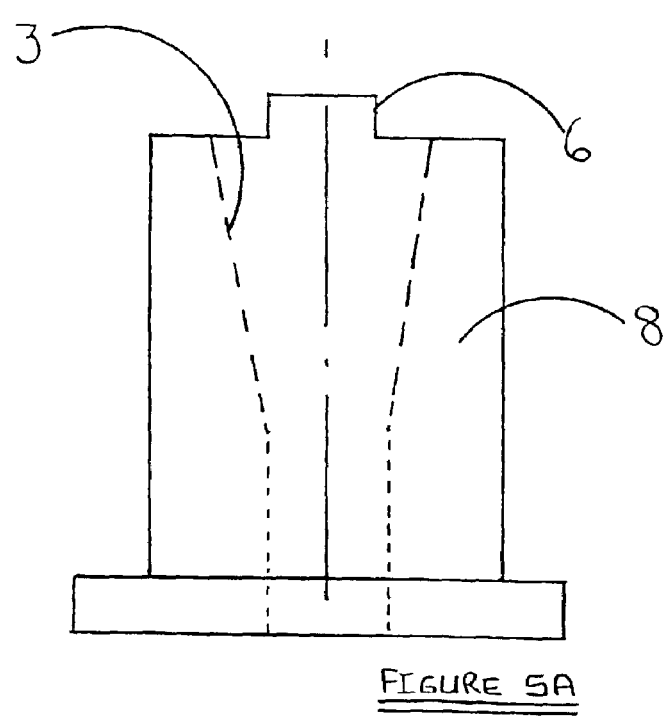
FIG. 5A is a cross section view of the fixed support block portion of the alignment assembly shown in FIG. 1.

In the invention, the keyway slots 11 and the frustoconical tapered portion 41 on the chuck are used to consistently fix and orient a chuck 10 into position in the same manner that these elements do whenever the chuck is connected to the spindle. FIG. 5A illustrates a support block 8 for assisting in accurately positioning each universal chuck employed to hold a tool. As shown in phantom lines in FIG. 5A a centrally located cavity 3 having a frustoconical upper portion and lower cylindrical portion is formed within the support block 8. The cavity 3 is shaped and sized so that the contacting cooperation of the chuck's frustoconical tapered portion 41, FIG. 4 with the frustoconical portion of the cavity 3, FIG. 5A centers the chuck within the cavity 3. The support block 8 includes one or two keys 6 on its top surface. The one or two keys 6 are shaped and sized to be snugly received within the chuck keyway slots 11, FIG. 4. The keys and key slots, are not intended to be limited to the shape disclosed in the illustrated embodiment. Alternatively the key 6 and key slot 11 may be corresponding rectangular, triangular, hexagon, polygon, oval or an irregular shape for instance as would be appropriate to accommodate the key slots 11 of a chuck/holder being loaded with a tap.

As well known in the art, most chucks have two notches oriented on opposite sides of the chuck one hundred eighty (180) degrees apart from each other. To ensure that the chuck is not positioned (180) degrees out of alignment some spindles in the prior art have key size or depth differences so that the chuck is located in the same orientation each time. Other tools and spindles with symmetrical-identical keys can be used in this process when the tool holders are placed on the block for receiving a tap, and one of the notches on the chuck and one key on the block are physically marked or identified for alignment purposes. This demarcation would insure that only one tool orientation is maintained in the present invention.

A clamp assembly 14, see FIG. 1, snugly clamps against the support block 8, which in this embodiment has a generally round cross-section, although it may alternatively have a square, rectangular or other irregular shaped cross-section. The clamp assembly includes two apposing members 5 and 7 that clamp together against the support block. A pair of bolts 16 are positioned on opposite sides of the support block 8 to tighten members 5 and 7 together. The members 5/7 generally have a semi-circular inner surface. The semi-circular inner surface corresponds in shape to the exterior surface of the support block, both members 5/7 clamp together against the external surface of the support block. The radial-angular positioning of the bracket assembly 30 relative to the block 8 is not critical to the function of the process; however, the relative axial position of the bracket assembly 30 with respect to the block 8 is critical to the proper alignment of each tap being used to sequentially cut threads into a substrate. It should be appreciated that the bolts 16 allow for axial adjustment of the bracket assembly 30 so that the cutting depth, the length "H" in FIG. 1, that the tap extends beyond the collet, can be varied and/or to accommodate longer or shorter chucks. The invention is not intended to be limited to the fastening members 5/7 in the illustrated embodiment, but that other well-known fastening means could alternatively be employed to fix the bracket assembly 30 into its axial position about the block 8.

The cantilever arm 18 of the invention has a first internally threaded blind alignment bore 17 adjacent to one end of the arm 18 and a second smooth throughbore 15, FIG. 3 (phantom lines) at an opposite end for receiving the threaded portion of thumb screw 19. The first threaded bore 17 is precisely made so that a tap 20 can be accurately aligned and positioned therein. The first threaded bore 17 and second throughbore 15 have central longitudinal axes that are both perpendicular to the longitudinal axis of the cantilever arm 18. The bottom surface 27 of the bore 17 can be configured to have a geometry that conforms to the bottom surface 26, see FIG. 3 of the tap as shown in FIG. 2. The depth "A" that the blind bore extends into the cantilever arm 18 as shown in FIG. 3 can be precisely machined. The pitch and geometry of the internal threads in the blind alignment bore 17 are nearly identical to the internal thread desired to be formed in a hard material workpiece. The smooth throughbore 15 is large enough to permit rotation of the cantilever arm.

As shown in FIG. 3, a tap 20 is preset by screwing the tap until it bottom's out into a temporary position in a threaded alignment bore 17 formed in the cantilevered arm 18. The cantilevered arm 18 is then fastened to a top surface of the bracket 30 support arm, see FIG. 1, by a knurled screw 19; thumbscrew, fastener, clamp or other equivalent means for attaching the cantilever arm 18 to the bracket.

The tap configuration illustrated in FIG. 2 and cooperating threads in the alignment bore 17 of the cantilever arm 18 are illustrative of one embodiment of a cantilever arm of the present invention having a threaded bore 17 suitable for receiving a tap as shown in FIG. 2 or similarly designed. It should be appreciated that other cantilever arms 18 having bores 17 with other different thread configurations may be employed to accommodate taps having different thread shapes and sizes.

As well known in the art, every tap has a leading cutting edge as illustrated in FIG. 2 at 28. The leading cutting edge 28 is the smallest cutting diameter on a tap, see 26 in FIG. 2. During a tapping operation, where the leading cutting edge first contacts the tap drill bore of the workpiece, is where the helical groove of the internal thread begins. It is essential that any subsequent tap that is employed to further increase the thread depth, in a series of taps as described above, must begin cutting at the same location where the first tap began cutting the helical thread. It should be appreciated that an apparatus is required that will perform the function of correctly positioning and orienting the leading cutting edge of each subsequent tap used in series so that each tap will begin cutting at the same location on the workpiece.

The method of aligning a first pilot tap in a series of taps of the present invention within a chuck is described next. First, the loosely fastened bracket assembly 30, FIG. 1, but for the disconnected cantilever arm 18, is slid into position along the Y—Y axis of support block 8. Then the bracket is tightly clamped to the block 8 by bolts 16. As can be appreciated, the block 8 can be marked with graduations to accurately measure the displacement that the cantilever arm 18 of the bracket extends above the top surface of the block 8. The chuck 10 is received in the support block as described above so as to be centrally positioned, and keyway(s) 11 aligned with key(s) 6. The cutting depth is the measured distance that the most forward cutting portion of the tap extends from the chuck (see "H" in FIG. 1). Upon inspection of FIG. 1, it can be seen that the cutting depth "H" is adjusted by sliding the bracket 30 up or down along axis Y—Y. Next, the cantilever arm 18 with the first tap 20 already properly positioned therein, is guided so the tap 20 is received within the chuck at one end, and at its other end, the knurled thumb screw 19 or similar device is simultaneously guided to be received in a threaded bore 21 having an opening in the top surface of an upwardly extending support arm 23 of the bracket. The central axis of the threaded bore 21 is parallel to the axis Y—Y of the support block 8. Similarly, the longitudinal axis (not shown) of the upward support bar 23 is also parallel to the axis Y—Y and the top surface of the support arm 23 is perpendicular to the Y—Y axis. The thumb screw 19 is tightened to hold the cantilever arm 18 firmly against the top surface of the upward support arm 23. When the thumb screw 19 is tightened, the cantilever arm 18 is oriented perpendicular to the Y—Y axis. Upon tightening of the thumb screw 19, the desired cutting depth "H" between the most forward cutting portion of the tap 20 and the top of chuck is arrived at. The tap 20 is now properly oriented into its predetermined and repeatable position with respect to the chuck. The chuck collet 40 (see phantom lines and FIG. 4) is then rotated as well known in the art to lock against the tap 20 fixing the tap into its proper orientation within the chuck.

After the collet 40 is firmly tightened to hold the tap 20 in position, thumb screw 19, FIG. 1, is loosened and removed so that the cantilever arm 18 may then be removed from the cutting end of the tap 20. The cantilever arm 18 is removed from the tap by either manually holding the chuck 10 or cantilever arm 18 in position and rotating the other (normally in a counterclockwise direction) so as to unthread the tap 20 from the cantilever arm 18.

As well known in the art, the cooperating shanks of cutting tools, such as the tap 20, are designed to have a geometry that cooperates with gripping surface on a chuck or collet. The surfaces on the chuck (collet) close on the tap 20 shank to lock the tap into position. Once the jaws are locked against the tap shank, the tap is securely held in position and not subject to axial and angular displacement. As can be appreciated, the chucks/collets employed in industry firmly fasten metal cutting tools within the chuck/collet so as to resist the substantial force and torques that arise during tapping and/or other metal cutting operations. Therefore, whenever a person manually rotates the chuck relative to the cantilever arm, the threaded connection between the tap 20 and cantilever arm 18 will disengage, not the coupling between the collet 40 and tap 20.

FIGS. 6A–6H illustrate the progression of the formation of internal threads in a workpiece 50, using two different tap series embodiments of the present invention, FIGS. 6A–6C and FIGS. 6E–6G. The workpiece material is a hard material, for instance workpiece 50 may be made from a heat treated hardened steel. This process would work equally well in soft materials or tough alloys. The internal threads are cut by employing three taps 61, 62, 63, similar to the geometry of the tap shown in FIG. 2, these taps 61, 62, 63 are used sequentially to cut the threads deeper and deeper into the workpiece in accordance with the invention. FIGS. 6A–6C illustrate a tap series where the pitch diameter of each successive tap increases to form deeper threads. FIGS. 6E–6H illustrate a tap series 67, 68, 69 where the pitch diameter is constant and the major thread diameter is a variable to produce the different depths of cut. Both tap series methods will produce acceptable threads. In FIG. 6A, near the bottom, 65 illustrates an internal sidewall of a tap drill bore prior to the initiation of tapping. The frustoconical phantom lines in FIG. 6A represent the desired internal threads in the finished product.

Near the top of FIG. 6A, a partial view of the first pilot tap 61 is illustrated. The first pilot tap 61 cuts out a frustoconical threaded portion from the interior sidewall 65, represented by the cross-hatching. This embodiment illustrates a tap with increasing pitch diameters. As can be seen in the partial drawings of the first pilot tap 61 in FIG. 6A, the first tap has a pitch diameter "C", that is slightly larger than the diameter of the smooth pilot bore. Near the bottom of FIG. 6B, the shallow internal threads 66 that were cut by the first pilot tap are illustrated. In FIG. 6B, a second tap 62 having a larger pitch diameter "C" is next employed to cut the internal threads even deeper into the workpiece 50, represented by the cross-hatching in FIG. 6B.

In FIG. 6C, near the bottom, the internal thread cut out by the second tap 62 is shown. Finally, a third tap 63 having even a greater pitch diameter "C" than the second tap 62 is employed to cut out the remaining material, represented by cross-hatching, to form the finished internally threaded bore having the desired pitch and thread depth. FIG. 6D illustrates the internal threads in the finished product.

FIGS. 6E–6G illustrate a second series of alternative taps that can be aligned for cutting/forming bore threads in accordance with the apparatus and method of the present invention. In this tap series the major diameter "C" of the taps 67, 68, 69 are respectively increased while the pitch diameter remains constant. The crosshatched areas in FIGS. 6E–6G represent material that is removed/cut from the tap drill bore 65. In FIG. 6F tap 68 with the same pitch diameter, but a larger major diameter "C" than tap 67 is used to remove more material from the thread form 70 previously produced. The crosshatched area in FIG. 6F represents the material being removed by tap 68. To complete the thread form, tap 69, see FIG. 6G, will remove/cut the remaining workpiece material as shown in the crosshatched area. This will also result in a final thread form illustrated in FIG. 6H.

FIGS. 6A–6D and 6E–6H illustrate the formation of the internal threads immediately adjacent the opening of a bore formed within a workpiece 50. It should be appreciated that the tapping process of the invention is not intended to be limited to forming a threaded bore equivalent to only two bolt revolutions, but the taps and tapping method of the invention can be used to tap very deep holes wherein the finished internal threads may even exceed the equivalent of three dozen revolutions. In manufacturing deeper holes with a greater number of thread revolutions and/or in harder materials wherein greater torques are applied to the taps, it is contemplated that more than three taps may be necessary to cut the internal threads. For each individual application, the torque applied during cutting actions, the material from which the tap is constructed, the workpiece material, the dimensions of the tap (diameter) and other physical parameters will determine the number of taps that are necessary to sequentially cut out internal threads into the workpiece.

The bracket assembly 30, FIG. 1, in the present invention is made from steel, but alternatively could be made from metals or rigid materials, including but not limited to Aluminum, brass, plastic and glass.

No specific configuration of the cooperating locking jaws and shank of the tap are considered critical to the invention. It is contemplated that most any wellknown collet or other tool holding system can be used in to hold a tap.

The invention tap is made of high speed steel (HSS), but it can be produced from other materials in order to improve the function of the taps. Taps are often used to produce threads in various semi-hard and tough materials. For instance, the hard material may be titanium or a titanium-based alloy.

In manufacturing the bracket 30, the downward surface 25, FIG. 3, on the cantilever arm 18 is ground smooth after the though bore 15 is drilled therein so as to remove any burrs that may exist after drilling. A flat horizontal downward surface is required to cooperate with a top flat horizontal surface on the upwardly extending support arm 23 FIG. 1.

The embodiment disclosed and illustrated provides a method for fixing the position of threading taps, but it is contemplated that this method of aligning tools used in sequence could be used to properly orient other metalworking tools that are used in sequence to machine products.

Other applications, embodiments and variations to the disclosed embodiments described herein will be apparent to those skilled in the art and may be made without departing from the spirit and scope of the invention as defined in the appended claims.

What is claimed is:

1. An alignment assembly for positioning a tap inside a chuck, the assembly comprising:
   a support block having a central longitudinal axis, and said support block adapted to receive said chuck;
   a fastener fastened to said support block;
   an upwardly extending support arm having opposite ends wherein the support arm is connected at one of said opposite ends to the fastener;

a cantilever arm, and the support arm is connected at other of said opposite ends to the cantilever arm;

said cantilever arm containing a threaded bore adapted to receive the tap; and wherein the threaded bore presents a configuration having a bottom with a geometry that substantially conforms to the geometry of the bottom of the tap.

2. An alignment assembly for positioning a tap inside a chuck, the assembly comprising:

a support block having a central longitudinal axis, and said support block adapted to receive said chuck;

a fastener fastened to said support block;

an upwardly extending support arm having opposite ends wherein the support arm is connected at one of said opposite ends to the fastener;

a cantilever arm, and the support arm is connected at other of said opposite ends to the cantilever arm;

said cantilever arm containing a threaded bore adapted to receive the tap; and wherein the threaded bore presents a threads having a pitch and geometry substantially similar to an internal thread desired to be formed by the tap.

3. An alignment assembly for positioning a tap inside a chuck, the assembly comprising:

a support block having a central longitudinal axis, and said support block adapted to receive said chuck;

a cantilever arm operatively connected to said support block, and said cantilever arm containing a threaded bore adapted to receive the tap; and wherein the threaded bore presents a configuration having a bottom with a geometry that substantially conforms to the geometry of the bottom of the tap.

4. An alignment assembly for positioning a tap inside a chuck, the assembly comprising:

a support block having a central longitudinal axis, and said support block adapted to receive said chuck;

a cantilever arm operatively connected to said support block, and said cantilever arm containing a threaded bore adapted to receive the tan; and wherein the threaded bore presents a threads having a pitch and geometry substantially similar to an internal thread desired to be formed by the tap.

* * * * *